2,879,243
COMPOUNDING OF RUBBER LATEX WITH A THIAZOLE ACCELERATOR AND AN ALKALI DIALKYL DITHIOPHOSPHATE AND RESULTING COMPOSITION

Everett V. Anderson, Bethany, Conn., assignor to United States Rubber Company, New York, N.Y., a corporation of New Jersey No Drawing. Application April 18, 1957
Serial No. 653,526

8 Claims. (Cl. 260—29.7)

The present invention relates to compounding rubber latex, more particularly in order that rubber goods formed from the latex may be vulcanized at low temperatures.

It is commonly necessary or desirable to compound rubber latex with sulfur, zinc oxide and accelerator so that rubber goods, such as films, formed from the latex may be vulcanized in a reasonable time at low temperatures about 100° C. (90° C.–110° C.). Dithiocarbamate accelerators are excellent low temperature accelerators, but they are very sensitive to the presence of metallic ions, such as iron and copper ions, forming highly colored salts. Latex rubber goods, therefore, which contain dithiocarbamates are subject to staining and undesirable discoloration if contaminated with iron and copper ions. Such staining has at times been the source of considerable difficulty in the carpet industry where latex is applied to the back of carpeting. Thiazole accelerators, on the other hand, are non-staining accelerators but they do not sufficiently accelerate vulcanization so that rubber articles containing the same can be vulcanized at about 100° C. in a reasonably short time.

I have found that alkali dialkyl dithiophosphates activate thiazole accelerators and form a non-staining accelerator combination in latex that will effectively vulcanize rubber articles formed from the latex at about 100° C.

In carrying out the invention, the latex is compounded with sulfur, zinc oxide, a thiazole accelerator and an alkali dialkyl dithiophosphate. The thus compounded latex is formed into an article, as for example, by spreading on the back of a carpet, drying to a rubber film, and heating at 90° C. to 110° C., thereby effectively vulcanizing the rubber film. The alkali dialkyl dithiophosphate does not act as an accelerator for latex rubber goods at temperatures of about 100° C. but it acts as an activator when used with thiazole accelerators. Further, the alkali dialkyl dithiophosphates do not discolor in the presence of iron and copper ions when used in combination with thiazole accelerators, although in the absence of a thiazole accelerator potassium diisopropyl dithiophosphate, for example, will stain yellow in the presence of a water soluble copper salt. Thus the thiazole accelerator makes the alkali dialkyl dithiophosphate activator non-staining.

The alkali dialkyl dithiophosphates used as activators for the thiazole accelerators in the present invention are the alkali, i. e. alkali-metal or ammonium, salts of the dialkyl dithiophosphoric acids. Examples of such alkali dialkyl dithiophosphates are potassium diisopropyl dithiophosphate having the structural formula

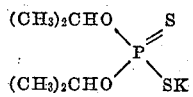

sodium diisopropyl dithiophosphate, ammonium diethyl dithiophosphate, ammonium di-sec-butyl dithiophosphate, ammonium bis (1,3-dimethyl butyl) dithiophosphate.

The thiazole accelerators used in the present invention are well known benzothiazole derivatives. Examples of such benzothiazole derivatives are 2-mercaptobenzothiazole, salts thereof such as the zinc salt of 2-mercaptobenzothiazole and the cyclohexylamine salt of 2-mercaptobenzothiazole, and benzothiazyl disulfide. The amount of alkali dialkyl dithiophosphate and thiazole accelerator used together will generally be in the range from 0.25 to 5 parts per 100 parts of rubber of the latex. The molar ratio of thiazole accelerator to alkali dialkyl dithiophosphate will generally be in the range from 3:1 to 1:3, and preferably from 1:1 to 1.5:1. The amount of sulfur used will generally be the conventional 0.5 to 5 parts per 100 parts of rubber of the latex and the amount of zinc oxide will generally be the conventional 0.25 to 4 parts per 100 parts of rubber of the latex. Generally the time for vulcanization at 90° C. to 110° C. will be 30 to 60 minutes.

The latex may be natural rubber latex or a synthetic rubber latex. The synthetic rubber latex may be a so-called butadiene polymer synthetic rubber latex, i. e., an aqueous emulsion polymerizate of one or more butadienes-1,3, for example, butadiene-1,3,2-methylbutadiene-1,3 (isoprene), 2,3-dimethyl-butadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more compounds which contain a $CH_2=C<$ group where at least one of the disconnected valences is attached to an electronegative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene; chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride; vinyl pyridines; alkyl vinyl pyridines.

The following examples illustrate the invention. All parts and percentages referred to herein are by weight.

Example 1

To portions of a natural rubber latex containing sulfur and zinc oxide were added potassium diisopropyl dithiophosphate alone, zinc salt of mercaptobenzothiazole alone, and both the potassium diisopropyl dithiophosphate and zinc salt of mercaptobenzothiazole according to the following table. Compounding ingredients in all the examples were added to the latex as aqueous solutions or water-ground pastes in the conventional manner.

|  | A | B | C |
|---|---|---|---|
| Rubber (solids of latex) | 100 | 100 | 100 |
| Potassium hydroxide | 0.25 | 0.25 | 0.25 |
| Latex stabilizer [1] | 0.75 | 0.75 | 0.75 |
| Sulfur | 1.0 | 1.0 | 1.0 |
| Zinc oxide | 0.75 | 0.75 | 0.75 |
| Potassium diisopropyl dithiophosphate | 1.0 |  | 1.0 |
| Zinc salt of 2-mercaptobenzothiazole |  | 1.5 | 1.5 |

[1] Sodium alkyl naphthalene sulfonate (Nekal A).

Test films were made by casting the compounds on glass plates, and allowing to dry at room temperature. Films were then stripped from the glass plates and heated in an air oven at 100° C. for 30 minutes. Stress-strain data obtained on the thus heated films are shown in the following table:

|  | Compound | | |
| --- | --- | --- | --- |
|  | A | B | C |
| Stress at 500% elongation (p.s.i.) |  | 135 | 310 |
| Stress at 700% elongation (p.s.i.) | 235 | 820 | 1,540 |
| Stress at 900% elongation (p.s.i.) | 820 | 2,160 |  |
| Tensile Strength at break (p.s.i.) | 1,900 | 3,150 | 4,750 |
| Elongation at break (percent) | 1,100 | 933 | 910 |

These figures show potassium diisopropyl dithiophosphate to have no accelerating activity when used alone. This is evident from the tensile and elongation at break values obtained with the "A" compound. These values are typical for an unvulcanized latex film. On the other hand, the "B" compound containing the zinc salt of mercaptobenzothiazole, shows incipient but not complete vulcanization under the same heating conditions. However, when potassium diisopropyl dithiophosphate is used in combination with the zinc salt of mercaptobenzothiazole as in the "C" compound complete vulcanization is obtained. Since potassium diisopropyl dithiophosphate has no accelerating activity this effect cannot be additive but must be due to activation of the thiazole.

*Example 2*

A synthetic rubber latex of a copolymer of equal parts of butadiene-1,3 and styrene (monomer charge recipe) polymerized at 41° F. to 50° F. to about 60% conversion (cold rubber) was compounded as shown in the following table:

|  | D | E | F |
| --- | --- | --- | --- |
| Rubber (solids of latex) | 100 | 100 | 100 |
| Latex stabilizer [1] | 1.0 | 1.0 | 1.0 |
| Sulfur | 4.0 | 4.0 | 4.0 |
| Zinc oxide | 3.0 | 3.0 | 3.0 |
| Potassium diisopropyl dithiophosphate | 1.0 |  | 1.0 |
| Zinc salt of 2-mercaptobenzothiazole |  | 1.5 | 1.5 |

[1] Polyethylene ether of a long chain fatty alcohol (Emulphor ON).

Test films were made as in Example 1. Stress-strain data obtained on the test films are shown in the following table:

|  | Compound | | |
| --- | --- | --- | --- |
|  | D | E | F |
| Stress at 500% elongation (p.s.i.) | 110 | 180 | 210 |
| Stress at 700% elongation (p.s.i.) | 190 | 295 | 670 |
| Tensile strength at break (p.s.i.) | 1,000 | 1,170 | 2,230 |
| Elongation at break (percent) | 1,070 | 930 | 900 |

As in Example 1, effective vulcanization was obtained only in the compound F containing both the potassium diisopropyl dithiophosphate and the zinc salt of 2-mercaptobenzothiazole.

*Example 3*

Natural latex was compounded as shown in the following table:

|  | G | H | I |
| --- | --- | --- | --- |
| Rubber (solids of latex) | 100 | 100 | 100 |
| Latex stabilizer [1] | 0.25 | 0.25 | 0.25 |
| Sulfur | 0.75 | 0.75 | 0.75 |
| Zinc oxide | 0.25 | 0.25 | 0.25 |
| Ammonium diethyl dithiophosphate | 1.0 |  | 1.0 |
| Zinc salt of 2-mercaptobenzothiazole |  | 1.5 | 1.5 |

[1] Sodium alkyl napthalene sulfonate (Nekal A).

Test films were made as in Example 1. Stress-strain data obtained on the test films are shown in the following table:

|  | Compound | | |
| --- | --- | --- | --- |
|  | G | H | I |
| Stress at 500% elongation (p.s.i.) | 150 | 85 | 180 |
| Stress at 700% elongation (p.s.i.) | 310 | 390 | 820 |
| Stress at 900% elongation (p.s.i.) |  | 1,320 | 3,210 |
| Tensile strength at break (p.s.i.) | 1,200 | 1,870 | 4,150 |
| Elongation at break (percent) | 900 | 1,000 | 975 |

Effective vulcanization was obtained only in the compound I containing both the ammonium diethyl dithiophosphate and the zinc salt of 2-mercaptobenzothiazole.

*Example 4*

Natural latex was compounded as shown in the following table:

|  | J | K |
| --- | --- | --- |
| Rubber (solids of latex) | 100 | 100 |
| Latex stabilizer [1] | 0.25 | 0.25 |
| Sulfur | 0.75 | 0.75 |
| Zinc oxide | 0.25 | 0.25 |
| Potassium diisopropyl dithiophosphate |  | 1.0 |
| Benzothiazyldisulfide | 1.5 | 1.5 |

[1] Sodium alkyl naphthalene sulfonate (Nekal A).

Test films were made as in Example 1. Stress-strain data obtained on the test films are shown in the following table:

|  | Compound | |
| --- | --- | --- |
|  | J | K |
| Stress at 500% elongation (p.s.i.) | 205 | 200 |
| Stress at 700% elongation (p.s.i.) | 685 | 1,700 |
| Stress at 900% elongation (p.s.i.) | 1,400 |  |
| Tensile strength at break (p.s.i.) | 1,510 | 4,600 |
| Elongation at break (percent) | 1,070 | 800 |

Effective vulcanization was obtained only in the compound K containing both the potassium diisopropyl dithiophosphate and benzothiazyldisulfide.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A rubber latex containing 0.5 to 5 parts of sulfur, 0.25 to 4 parts of zinc oxide, and 0.25 to 5 parts of a mixture of a thiazole accelerator and an alkali dialkyl dithiophosphate, per 100 parts of rubber solids of the latex, the molar ratio of thiazole accelerator to alkali dialkyl dithiophosphate being in the range from 3:1 to 1:3, the rubber latex being selected from the group consisting of natural rubber latex and butadiene polymer synthetic rubber latices, the thiazole accelerator being selected from the group consisting of 2-mercaptobenzothiazole, salts of 2-mercaptobenzothiazole and benzothiazyldisulfide, and the alkali dialkyl dithiophosphate being selected from the group consisting of potassium, sodium and ammonium dialkyl dithiophosphates in which each alkyl group contains 2 to 4 carbon atoms.

2. A rubber latex containing 0.5 to 5 parts of sulfur, 0.25 to 4 parts of zinc oxide, and 0.25 to 5 parts of a mixture of a thiazole accelerator and an alkali dialkyl dithiophosphate, per 100 parts of rubber solids of the latex, the molar ratio of thiazole accelerator to alkali dialkyl dithiophosphate being in the range from 1:1 to 1.5:1, the rubber latex being selected from the group consisting of natural rubber latex and butadiene polymer synthetic rubber latices, the thiazole accelerator being selected from the group consisting of 2-mercaptobenzothiazole, salts of 2-mercaptobenzothiazole and benzothiazyldisulfide, and the alkali dialkyl dithiophosphate being selected from the group consisting of potassium, sodium and ammonium dialkyl dithiophosphates in which each alkyl group contains 2 to 4 carbon atoms.

3. A rubber latex containing 0.5 to 5 parts of sulfur, 0.25 to 4 parts of zinc oxide, and 0.25 to 5 parts of a mixture of zinc salt of 2-mercaptobenzothiazole and potassium diisopropyl dithiophosphate, per 100 parts of solids of the latex, the molar ratio of the zinc salt of 2-mercaptobenzothiazole to potassium diisopropyl dithiophosphate being in the range from 3:1 to 1:3, a dried film of the thus compounded latex being vulcanizable at 100° C., the rubber latex being selected from the group consisting of natural rubber latex and butadiene polymer synthetic rubber latices.

4. Natural rubber latex containing 0.5 to 5 parts of sulfur, 0.25 to 4 parts of zinc oxide, and 0.25 to 5 parts of a mixture of zinc salt of 2-mercaptobenzothiazole, and potassium diisopropyl dithiophosphate, per 100 parts of solids of the latex, the molar ratio of the zinc salt of 2-mercaptobenzothiazole to potassium diisopropyl dithiophosphate being in the range from 1:1 to 1.5:1, a dried film of the thus compounded latex being vulcanizable at 100° C.

5. A rubber latex containing 0.5 to 5 parts of sulfur, 0.25 to 4 parts of zinc oxide, and 0.25 to 5 parts of a mixture of zinc salt of 2-mercaptobenzothiazole and ammonium diethyl dithiophosphate, per 100 parts of rubber solids of the latex, the molar ratio of the zinc salt of 2-mercaptobenzothiazole to ammonium diethyl dithiophosphate being in the range from 3:1 to 1:3, a dried film of the thus compounded rubber being vulcanizable at 100° C., the rubber latex being selected from the group consisting of natural rubber latex and butadiene polymer synthetic rubber latices.

6. Natural rubber latex containing 0.5 to 5 parts of sulfur, 0.25 to 4 parts of zinc oxide, and 0.25 to 5 parts of a mixture of zinc salt of 2-mercaptobenzothiazole and ammonium diethyl dithiophosphate, per 100 parts of rubber solids of the latex, the molar ratio of the zinc salt of 2-mercaptobenzothiazole to ammonium diethyl dithiophosphate being in the range from 1:1 to 1.5:1, a dried film of the thus compounded rubber being vulcanizable at 100° C.

7. The method which comprises drying a film of a rubber latex containing 0.5 to 5 parts of sulfur, 0.25 to 4 parts of zinc oxide, and 0.25 to 5 parts of a mixture of a thiazole accelerator and an alkali dialkyl dithiophosphate, per 100 parts of rubber solids of the latex, the molar ratio of thiazole accelerator to alkali dialkyl dithiophosphate being in the range from 3:1 to 1:3, and heating at 90° C. to 110° C. to vulcanize said film, the rubber latex being selected from the group consisting of natural rubber latex and butadiene polymer synthetic rubber latices, the thiazole accelerator being selected from the group consisting of 2-mercaptobenzothiazole, salts of 2-mercaptobenzothiazole and benzothiazyldisulfide, and the alkali dialkyl dithiophosphate being selected from the group consisting of potassium, sodium and ammonium dialkyl dithiophosphates in which each alkyl group contains 2 to 4 carbon atoms.

8. The method which comprises drying a film of a rubber latex containing 0.5 to 5 parts of sulfur, 0.25 to 4 parts of zinc oxide, and 0.25 to 5 parts of a mixture of a thiazole accelerator and an alkali dialkyl dithiophosphate, per 100 parts of rubber solids of the latex, the molar ratio of thiazole accelerator to alkali dialkyl dithiophosphate being in the range from 1:1 to 1.5:1, and heating at 90° C. to 110° C. to vulcanize said film, the rubber latex being selected from the group consisting of natural rubber latex and butadiene polymer synthetic rubber latices, the thiazole accelerator being selected from the group consisting of 2-mercaptobenzothiazole, salts of 2-mercaptobenzothiazole and benzothiazyldisulfide, and the alkali dialkyl dithiophosphate being selected from the group consisting of potassium, sodium and ammonium dialkyl dithiophosphates in which each alkyl group contains 2 to 4 carbon atoms.

References Cited in the file of this patent

UNITED STATES PATENTS

| | | |
|---|---|---|
| 1,867,631 | Romieux et al. | July 19, 1932 |
| 2,409,344 | Davis | Oct. 15, 1946 |

FOREIGN PATENTS

| | | |
|---|---|---|
| 362,862 | Great Britain | Dec. 8, 1931 |
| 470,791 | Great Britain | Aug. 23, 1937 |
| 652,668 | Great Britain | Apr. 25, 1951 |